US012054628B2

(12) United States Patent
Quinn

(10) Patent No.: US 12,054,628 B2
(45) Date of Patent: Aug. 6, 2024

(54) BINDER COMPOSITIONS WITH POLYVALENT PHOSPHORUS CROSSLINKING AGENTS

(71) Applicant: Owens Corning Intellectual Capital, LLC, Toledo, OH (US)

(72) Inventor: Robert E. Quinn, Baton Rouge, LA (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 554 days.

(21) Appl. No.: 17/314,142

(22) Filed: May 7, 2021

(65) Prior Publication Data

US 2021/0261811 A1   Aug. 26, 2021

Related U.S. Application Data

(60) Continuation of application No. 15/964,833, filed on Apr. 27, 2018, now abandoned, which is a division of application No. 13/187,650, filed on Jul. 21, 2011, now Pat. No. 9,957,409.

(51) Int. Cl.
| | | |
|---|---|---|
| C09D 143/02 | (2006.01) | |
| C09D 103/02 | (2006.01) | |
| C09D 103/04 | (2006.01) | |
| C09D 105/00 | (2006.01) | |
| C09D 105/06 | (2006.01) | |

(52) U.S. Cl.
CPC ......... C09D 143/02 (2013.01); C09D 103/02 (2013.01); C09D 103/04 (2013.01); C09D 105/00 (2013.01); C09D 105/06 (2013.01); *Y10T 442/60* (2015.04)

(58) Field of Classification Search
CPC .. C09D 143/02; C09D 103/02; C09D 103/04; C09D 105/00; C09D 105/16
See application file for complete search history.

(56) References Cited

U.S. PATENT DOCUMENTS

| | | |
|---|---|---|
| 2,407,548 A | 9/1946 | Goldman |
| 3,416,288 A | 12/1968 | Coons |
| 3,669,638 A | 6/1972 | Robert et al. |
| 3,705,073 A | 12/1972 | Marzocchi et al. |
| 3,759,854 A | 9/1973 | Chang et al. |
| 3,846,977 A | 11/1974 | Currat |
| 3,944,690 A | 3/1976 | Distler et al. |
| 4,052,257 A | 10/1977 | Hill et al. |
| 4,054,713 A | 10/1977 | Sakaguchi et al. |
| 4,324,833 A | 4/1982 | Yau |
| 5,055,428 A | 10/1991 | Porter |
| 5,077,361 A | 12/1991 | Hughes et al. |
| 5,116,980 A | 5/1992 | Gabel |
| 5,134,160 A | 7/1992 | Whitekettle et al. |
| 5,162,394 A | 11/1992 | Trocino et al. |
| 5,208,075 A | 5/1993 | Kroner et al. |
| 5,284,700 A | 2/1994 | Strauss et al. |
| 5,312,064 A | 5/1994 | Uesugi et al. |
| 5,318,990 A | 6/1994 | Strauss |
| 5,340,868 A | 8/1994 | Strauss et al. |
| 5,346,947 A | 9/1994 | Guerro et al. |
| 5,371,140 A | 12/1994 | Parks |
| 5,393,335 A | 2/1995 | Puckett et al. |
| 5,430,070 A | 7/1995 | Kono |
| 5,446,078 A | 8/1995 | Vaidya et al. |
| 5,480,963 A | 1/1996 | Jiang et al. |
| 5,523,264 A | 6/1996 | Mattson |
| 5,565,254 A | 10/1996 | Norvell |
| 5,582,682 A | 12/1996 | Ferretti |
| 5,635,123 A | 6/1997 | Riebel et al. |
| 5,661,213 A * | 8/1997 | Arkens ................. D04H 1/587 524/556 |
| 5,714,264 A | 2/1998 | Sacharski et al. |

(Continued)

FOREIGN PATENT DOCUMENTS

| | | |
|---|---|---|
| CN | 101203555 | 6/2008 |
| CN | 101218186 | 7/2008 |

(Continued)

OTHER PUBLICATIONS

International Search Report and Written Opinion from PCT/US10/030852 dated Aug. 25, 2010.
International Search Report and Written Opinion from PCT/US10/34670 dated Oct. 28, 2010.
International Search Report and Written Opinion from PCT/US10/040276 dated Oct. 1, 2010.
International Search Report and Written Opinion from PCT/US10/52028 dated Feb. 11, 2011.
International Search Report and Written Opinion from PCT/US12/27226 dated Jun. 25, 2012.
International Search Report and Written Opinion from PCT/US12/32118 dated Sep. 11, 2012.
Office action from U.S. Appl. No. 12/758,910 dated Dec. 3, 2012.
Office action from U.S. Appl. No. 12/758,910 dated May 6, 2013.

(Continued)

*Primary Examiner* — Kelly M Gambetta
(74) *Attorney, Agent, or Firm* — Calfee, Halter & Griswold LLP

(57) ABSTRACT

An fibrous insulation product is provided that includes a binder comprising a polyol and a phosphorus crosslinking agent derived from a phosphonic or phosphoric acid, salt, ester or anhydride to form crosslinked phosphodiester linkages. The polyol is polyvalent, but may be monomeric or preferably polymeric; and may be synthetic or natural in origin. Carbohydrate polysaccharides are exemplary polyols, including water-soluble polysaccharides such as dextrin, maltodextrin, starch, modified starch, etc. Additionally, the carbohydrate polymer may have a dextrose equivalent (DE) number from 2 to 20. In exemplary embodiments, the binder may also include a catalyst, a coupling agent, a process aid, and other additives. The environmentally friendly, formaldehyde-free binder may be used in the formation of residential and commercial insulation materials and non-woven chopped strand mats. A method of making fibrous products is also provided.

10 Claims, No Drawings

(56) References Cited

U.S. PATENT DOCUMENTS

| | | | |
|---|---|---|---|
| 5,888,292 A | 3/1999 | Tremblay | |
| 5,895,804 A | 4/1999 | Lee et al. | |
| 5,932,499 A | 8/1999 | Xu et al. | |
| 5,983,598 A | 11/1999 | Quinones | |
| 6,176,973 B1 | 1/2001 | Norlander | |
| 6,182,422 B1 | 2/2001 | Andersen et al. | |
| 6,221,973 B1 | 4/2001 | Arkens et al. | |
| 6,274,661 B1 | 8/2001 | Chen et al. | |
| 6,299,936 B1 | 10/2001 | Reck et al. | |
| 6,331,350 B1 | 12/2001 | Taylor et al. | |
| 6,369,104 B1 | 4/2002 | Kleina et al. | |
| 6,399,694 B1 | 6/2002 | McGrath et al. | |
| 6,439,383 B1 | 8/2002 | Janousek | |
| 6,447,596 B1 | 9/2002 | Tremblay et al. | |
| 6,527,014 B1 | 3/2003 | Aubourg | |
| 6,613,152 B1 | 9/2003 | Maas et al. | |
| 6,632,925 B1 | 10/2003 | Zhang et al. | |
| 6,699,945 B1 | 3/2004 | Chen et al. | |
| 6,878,455 B2 | 4/2005 | Kunzel et al. | |
| 6,884,849 B2 | 4/2005 | Chen et al. | |
| 6,890,666 B2 | 5/2005 | Kunzel et al. | |
| 6,933,349 B2 | 8/2005 | Chen et al. | |
| 7,026,390 B2 | 4/2006 | O'Brien-Bernini et al. | |
| 7,141,626 B2 | 11/2006 | Rodrigues et al. | |
| 7,258,802 B2 | 8/2007 | Miks | |
| 7,754,020 B2 | 7/2010 | Cline et al. | |
| 7,772,347 B2 | 8/2010 | Swift et al. | |
| 7,780,858 B2 | 8/2010 | Miks | |
| 7,803,879 B2 | 9/2010 | Srinivasan et al. | |
| 7,807,771 B2 | 10/2010 | Swift et al. | |
| 7,829,197 B2 | 11/2010 | Chen et al. | |
| 7,829,611 B2 | 11/2010 | Kelly | |
| 7,842,382 B2 | 11/2010 | Helbing | |
| 7,854,980 B2 | 12/2010 | Jackson et al. | |
| 7,893,154 B2 | 2/2011 | Van Herwijnen et al. | |
| 7,935,274 B2 | 5/2011 | Schlosser | |
| 8,053,049 B2 | 11/2011 | Ruid et al. | |
| 8,197,587 B2 | 6/2012 | Jaffrennou et al. | |
| 8,569,315 B2 | 10/2013 | Sianawati et al. | |
| 8,864,893 B2 | 10/2014 | Hawkins et al. | |
| 8,980,807 B2 | 3/2015 | Hora et al. | |
| 2001/0033926 A1 | 10/2001 | Matthews et al. | |
| 2002/0182965 A1 | 12/2002 | Snyder | |
| 2002/0188055 A1 | 12/2002 | Chen et al. | |
| 2003/0008978 A1 | 1/2003 | Chen et al. | |
| 2003/0022580 A1 | 1/2003 | Bogrett et al. | |
| 2003/0181602 A1 | 9/2003 | Ansmann et al. | |
| 2004/0001963 A1 | 1/2004 | Watanabe et al. | |
| 2004/0043686 A1 | 3/2004 | Batdorf | |
| 2004/0103604 A1 | 6/2004 | Kunzel et al. | |
| 2004/0122166 A1 | 6/2004 | O'Brien-Bernini et al. | |
| 2004/0254285 A1 | 12/2004 | Rodrigues et al. | |
| 2005/0070186 A1 | 3/2005 | Shoemake et al. | |
| 2005/0084675 A1 | 4/2005 | Wang | |
| 2005/0170721 A1 | 8/2005 | Toas et al. | |
| 2005/0192390 A1 | 9/2005 | Dobrowolski et al. | |
| 2005/0215153 A1 | 9/2005 | Cossement et al. | |
| 2005/0260368 A1 | 11/2005 | Ruid et al. | |
| 2005/0284065 A1 | 12/2005 | Shaffer | |
| 2006/0057365 A1 | 3/2006 | Swoboda et al. | |
| 2006/0111480 A1 | 5/2006 | Hansen et al. | |
| 2006/0178064 A1 | 8/2006 | Balthes et al. | |
| 2006/0252855 A1 | 11/2006 | Pisanova et al. | |
| 2006/0252955 A1 | 11/2006 | Rosier et al. | |
| 2007/0010651 A1 | 1/2007 | Finch et al. | |
| 2007/0014995 A1 | 1/2007 | Chacko et al. | |
| 2007/0027283 A1 | 2/2007 | Swift et al. | |
| 2007/0036975 A1 | 2/2007 | Miele et al. | |
| 2007/0054082 A1 | 3/2007 | Beyer et al. | |
| 2007/0287019 A1 | 12/2007 | Chen et al. | |
| 2008/0051539 A1 | 2/2008 | Kelly | |
| 2008/0108741 A1 | 5/2008 | Van Herwijnen et al. | |
| 2008/0115460 A1 | 5/2008 | Ruid et al. | |
| 2008/0156041 A1 | 7/2008 | Cooper et al. | |
| 2008/0216450 A1 | 9/2008 | MacLeod et al. | |
| 2008/0281285 A1 | 11/2008 | Noda et al. | |
| 2009/0020448 A1 | 1/2009 | Emond et al. | |
| 2009/0068416 A1 | 3/2009 | Noda et al. | |
| 2009/0080938 A1 | 3/2009 | Nagamine | |
| 2009/0098387 A1 | 4/2009 | Brady et al. | |
| 2009/0156080 A1 | 6/2009 | Finch et al. | |
| 2009/0169867 A1 | 7/2009 | Kelly | |
| 2009/0170978 A1 | 7/2009 | Kelly | |
| 2009/0250183 A1 | 10/2009 | Hayes et al. | |
| 2009/0275699 A1 | 11/2009 | Zhang et al. | |
| 2009/0324915 A1 | 12/2009 | Swift et al. | |
| 2010/0048813 A1 | 2/2010 | Clauss et al. | |
| 2010/0063166 A1 | 3/2010 | Behler | |
| 2010/0139899 A1 | 6/2010 | Suzuki et al. | |
| 2010/0147032 A1 | 6/2010 | Chacko et al. | |
| 2010/0203790 A1 | 8/2010 | Moulton et al. | |
| 2010/0222463 A1* | 9/2010 | Brady | D06M 15/03 524/27 |
| 2010/0242402 A1 | 9/2010 | Briner et al. | |
| 2010/0282996 A1 | 11/2010 | Jaffrennou et al. | |
| 2010/0300983 A1 | 12/2010 | Miks | |
| 2010/0301256 A1 | 12/2010 | Hampson et al. | |
| 2010/0305271 A1 | 12/2010 | Mentink et al. | |
| 2010/0310867 A1 | 12/2010 | Van Herwijnen et al. | |
| 2010/0320113 A1 | 12/2010 | Swift | |
| 2011/0003522 A1 | 1/2011 | Chen et al. | |
| 2011/0021101 A1 | 1/2011 | Hawkins et al. | |
| 2011/0060095 A1 | 3/2011 | Tutin et al. | |
| 2011/0086567 A1 | 4/2011 | Hawkins et al. | |
| 2011/0091710 A1 | 4/2011 | Mirth et al. | |
| 2011/0100256 A1 | 5/2011 | Anderson et al. | |
| 2011/0200814 A1 | 8/2011 | Hernandez-Torres et al. | |
| 2011/0210280 A1 | 9/2011 | Jaffrennou | |
| 2011/0223364 A1* | 9/2011 | Hawkins | C09D 133/02 428/292.1 |
| 2011/0263757 A1 | 10/2011 | Rand et al. | |
| 2012/0065417 A1 | 3/2012 | Hora et al. | |
| 2012/0070645 A1 | 3/2012 | Jaffrennou et al. | |
| 2012/0122758 A1 | 5/2012 | Andjelic et al. | |
| 2012/0133073 A1 | 5/2012 | Pacorel et al. | |
| 2012/0144868 A1 | 6/2012 | Mirth et al. | |
| 2013/0023174 A1 | 1/2013 | Quinn | |
| 2013/0065803 A1 | 3/2013 | Hora et al. | |
| 2013/0067861 A1 | 3/2013 | Turner et al. | |
| 2013/0211068 A1 | 8/2013 | Anderson et al. | |
| 2014/0038485 A1 | 2/2014 | Anderson et al. | |
| 2014/0051824 A1 | 2/2014 | Anderson et al. | |
| 2014/0083328 A1 | 3/2014 | Lochel, Jr. et al. | |
| 2015/0152244 A1 | 6/2015 | Hernandez-Torres | |

FOREIGN PATENT DOCUMENTS

| | | |
|---|---|---|
| CN | 101939268 | 1/2011 |
| CN | 102695684 | 9/2012 |
| EP | 44614 | 1/1982 |
| EP | 405921 | 1/1991 |
| EP | 1884526 | 2/2008 |
| EP | 2093266 | 8/2009 |
| EP | 1095977 | 5/2011 |
| GB | 865380 | 4/1961 |
| JP | 60-099180 | 6/1985 |
| JP | 2000-063782 | 2/2000 |
| NO | 99/039039 | 8/1999 |
| NO | 10/132641 | 11/2010 |
| WO | 93/015140 | 8/1993 |
| WO | 96/039364 | 12/1996 |
| WO | 99/61538 | 12/1999 |
| WO | 02/02476 | 1/2002 |
| WO | 02/077038 | 10/2002 |
| WO | 02/096819 | 12/2002 |
| WO | 04/50978 | 6/2004 |
| WO | 06/120523 | 11/2006 |
| WO | 07/008412 | 1/2007 |
| WO | 08/11455 | 1/2008 |
| WO | 2009/006532 | 1/2009 |
| WO | 2009/019232 | 2/2009 |
| WO | 2009/019235 | 2/2009 |
| WO | 09/034549 | 3/2009 |
| WO | 09/046521 | 4/2009 |

(56) References Cited

FOREIGN PATENT DOCUMENTS

| WO | 09/080696 | 7/2009 |
|---|---|---|
| WO | 09/080938 | 7/2009 |
| WO | 09/095617 | 8/2009 |
| WO | 10/19166 | 3/2010 |
| WO | 10/29266 | 3/2010 |
| WO | 10/120748 | 10/2010 |
| WO | 10/135637 | 11/2010 |
| WO | 10/139899 | 12/2010 |
| WO | 11/002730 | 1/2011 |
| WO | 11/044490 | 4/2011 |
| WO | 12/118939 | 9/2012 |
| WO | 12/138723 | 10/2012 |

OTHER PUBLICATIONS

Office action from U.S. Appl. No. 12/776,703 dated Oct. 5, 2012.
Office action from U.S. Appl. No. 12/776,703 dated Oct. 6, 2014.
Office action from U.S. Appl. No. 12/776,703 dated May 2, 2013.
Office action from U.S. Appl. No. 12/776,703 dated Aug. 15, 2013.
Office action from U.S. Appl. No. 12/776,703 dated Mar. 20, 2014.
Office action from U.S. Appl. No. 12/825,375 dated Oct. 9, 2012.
Office action from U.S. Appl. No. 12/825,375 dated May 23, 2013.
Office action from U.S. Appl. No. 12/825,375 dated Sep. 12, 2013.
Office action from U.S. Appl. No. 12/825,375 dated Apr. 24, 2014.
Office action from U.S. Appl. No. 12/825,375 dated Feb. 13, 2015.
Office action from U.S. Appl. No. 12/825,375 dated Oct. 23, 2015.
Office action from U.S. Appl. No. 12/825,375 dated Apr. 7, 2016.
Office action from U.S. Appl. No. 12/825,375 dated Dec. 1, 2016.
Office action from U.S. Appl. No. 12/825,375 dated Jun. 15, 2018.
Office action from U.S. Appl. No. 12/900,540 dated Nov. 29, 2012.
Interview Summary from U.S. Appl. No. 12/900,540 dated Feb. 15, 2013.
Office action from U.S. Appl. No. 12/900,540 dated May 9, 2013.
Office action from U.S. Appl. No. 12/900,540 dated Jul. 5, 2013.
Office action from U.S. Appl. No. 12/900,540 dated Feb. 12, 2014.
Office action from U.S. Appl. No. 12/900,540 dated Jul. 15, 2014.
Notice of Allowance from U.S. Appl. No. 12/900,540 dated Sep. 8, 2014.
Office action from U.S. Appl. No. 13/026,415 dated Feb. 1, 2013.
Office action from U.S. Appl. No. 13/026,415 dated Jul. 18, 2013.
Office action from U.S. Appl. No. 13/026,415 dated Feb. 10, 2014.
Office action from U.S. Appl. No. 13/026,415 dated Jul. 15, 2014.
Office action from U.S. Appl. No. 13/026,415 dated Jan. 13, 2015.
Office action from U.S. Appl. No. 13/026,415 dated Jun. 3, 2015.
Office action from U.S. Appl. No. 13/026,415 dated Dec. 2, 2015.
Office action from U.S. Appl. No. 13/026,415 dated Apr. 20, 2016.
Notice of Allowance from U.S. Appl. No. 13/026,415 dated Jul. 20, 2016.
Notice of Allowance from U.S. Appl. No. 13/026,415 dated Dec. 28, 2016.
Corrected Notice of Allowability from U.S. Appl. No. 13/026,415 dated Feb. 17, 2017.
Office action from U.S. Appl. No. 13/037,725 dated Oct. 15, 2012.
Interview Summary from U.S. Appl. No. 13/037,725 dated Feb. 15, 2013.
Office action from U.S. Appl. No. 13/037,725 dated May 6, 2013.
Office action from U.S. Appl. No. 13/037,725 dated Jul. 5, 2013.
Office action from U.S. Appl. No. 13/187,650 dated May 3, 2013.
Office action from U.S. Appl. No. 13/187,650 dated Nov. 26, 2013.
Office action from U.S. Appl. No. 13/187,650 dated Mar. 7, 2014.
Office action from U.S. Appl. No. 13/187,650 dated Nov. 6, 2014.
Office action from U.S. Appl. No. 13/187,650 dated Mar. 20, 2015.
Office action from U.S. Appl. No. 13/187,650 dated Nov. 16, 2015.
Correspondence to the EPO dated Oct. 19, 2012 from the Patentee responding to communication dated Jun. 19, 2012 regarding Opposition to EP Application No. 03768889.2 (EP Patent No. 1578879).
Correspondence to the EPO dated Oct. 18, 2012 from the Opponent/Respondent responding to communication dated Jun. 19, 2012 regarding Opposition to EP Application No. 03768889.2 (EP Patent No. 1578879).
Communication from the EPO dated Jun. 19, 2012 regarding Opposition to EP Application No. 03768889.2 (EP Patent No. 1578879).
Correspondence to the EPO dated Jun. 1, 2012 from the Patentee regarding Opposition to EP Application No. 03768889.2 (EP Patent No. 1578879).
Communication from the Boards of Appeal of the European Patent Office regarding Decision dated Apr. 5, 2012 regarding Opposition to EP Application No. 03768889.2 (EP Patent No. 1578879).
Communication from the EPO regarding Minutes of the Public Oral Proceedings before the Technical Board of Appeal dated Apr. 5, 2012 regarding Opposition to EP Application No. 03768889.2 (EP Patent No. 1578879).
Correspondence to the EPO dated Apr. 3, 2012 from the Patentee regarding response to submission of Mar. 20, 2012 by the Opponent/Respondent regarding Opposition to EP Application No. 03768889.2 (EP Patent No. 1578879).
Communication from the EPO dated Mar. 23, 2012 confirming Oral Proceeding date regarding Opposition to EP Application No. 03768889.2 (EP Patent No. 1578879).
Correspondence to the EPO dated Mar. 20, 2012 from the Opponent/Respondent regarding Opposition to EP Application No. 03768889.2 (EP Patent No. 1578879).
Correspondence to the EPO dated Mar. 2, 2012 from the Patentee regarding Opposition to EP Application No. 03768889.2 (EP Patent No. 1578879).
Correspondence to the EPO dated Mar. 1, 2012 from the Opponent/Respondent regarding Opposition to EP Application No. 03768889.2 (EP Patent No. 1578879).
Communication from the EPO dated Dec. 21, 2011 regarding Summons to Oral Proceedings regarding Opposition to EP Application No. 03768889.2 (EP Patent No. 1578879).
Correspondence to the EPO dated Nov. 2, 2012 from the Opponent/Respondent regarding Opposition to EP Application No. 03768889.2 (EP Patent No. 1578879).
Communication from the EPO dated Aug. 11, 2010 regarding Opposition to EP Application No. 03768889.2 (EP Patent No. 1578879).
Communication from the EPO dated Jul. 27, 2010 regarding Opposition to EP Application No. 03768889.2 (EP Patent No. 1578879).
Correspondence to the EPO dated Jul. 21, 2010 from the Patentee regarding Opposition to EP Application No. 03768889.2 (EP Patent No. 1578879).
Communication from the EPO dated Mar. 19, 2010 regarding Opposition to EP Application No. 03768889.2 (EP Patent No. 1578879).
Communication from the EPO dated Mar. 19, 2010 regarding minutes of Oral Proceedings for Opposition to EP Application No. 03768889.2 (EP Patent No. 1578879).
Correspondence to EPO dated Jan. 22, 2010 from Opponent/Respondent regarding Opposition to EP Application No. 03768889.2 (EP Patent No. 1578879).
Correspondence to the EPO dated Jan. 11, 2010 from Opponent/Respondent regarding Opposition to EP Application No. 03768889.2 (EP Patent No. 1578879).
Correspondence to the EPO dated Jan. 11, 2010 from the Patentee regarding Opposition to EP Application No. 03768889.2 (EP Patent No. 1578879).
Correspondence to the EPO dated Jan. 7, 2010 from the Patentee regarding Opposition to EP Application No. 03768889.2 (EP Patent No. 1578879).
Communication from the EPO dated Jul. 14, 2009 regarding Summons to attend Oral Proceedings for Opposition to EP Application No. 03768889.2 (EP Patent No. 1578879).
Correspondence to the EPO dated May 6, 2008 from the Patentee regarding Opposition to EP Application No. 03768889.2 (EP Patent No. 1578879).
Correspondence to the EPO dated Feb. 11, 2008 from the Patentee regarding Opposition to EP Application No. 03768889.2 (EP Patent No. 1578879).
Communication from the EPO dated Nov. 16, 2007 regarding a Notice of Opposition filing for Opposition to EP Application No. 03768889.2 (EP Patent No. 1578879).

(56) References Cited

OTHER PUBLICATIONS

Communication from the EPO dated Oct. 19, 2007 regarding a Notice of Opposition filing for Opposition to EP Application No. 03768889.2 (EP Patent No. 1578879).
Correspondence from Opponent/Respondent to the EPO dated Oct. 15, 2007 regarding Opposition to EP Application No. 03768889.2 (EP Patent No. 1578879).
Communication from the EPO dated Oct. 15, 2007 regarding Opposition to EP Application No. 03768889.2 (EP Patent No. 1578879).
Communication from the EPO dated May 20, 2010 regarding Opposition to EP Application No. 03768889.2 (EP Patent No. 1578879).
Office action from Japanese Application No. 2013-556848 dated May 8, 2015.
Office action from Japanese Application No. 2013-556848 dated Jul. 8, 2015.
Office action from Japanese Application No. 2013-556848 dated May 31, 2016.
Office action for Japanese Application No. 2016-197000 dated Feb. 26, 2018.
Office action from Korean Application No. 10-2013-7025860 dated Feb. 23, 2018.
About.com "Monomeric Unit", accessed Jun. 18, 2012, http://composite.about.com/library/glossary/m/bldef-m3521.htm.
Handbook of Adhesive Technology: Chapter 15—Carbohydrate Polymers as Adhesives, by Melissa Baumann and Anthony Conner, edited by A. Pizzi and K. Mittal, New York: Marcel Dekker, Inc. 1994.
American Chemical Society, Citric Acid, Jan. 30, 2014, 3 pgs.
Arch Chemicals, Building Products Biocide Selection Guide, Mar. 12, 2006.
Kearsley, M, Physical and Chemical Properties of Glucose Syrups, Handbook of Starch Hydrolysis Products and their Derivatives, Chapman and Hall, 1995.
Archimica, "Vinylphosphonic acid and vinylphosphonic dimethyl ester", version 1, 2009.
Alvatroni et al., "Maltodextrin molecular weight distribution influence on the glass transition temperature and viscosity in aqueous solutions", Carbohydrate Polymers, 58, pp. 323-334 (2004).
Blamire, John, "Science at a Distance", Science at a Distance, accessed Jun. 17, 2013, http://www.brooklyn.cuny.edu/bc/ahp/SDPS/SD.PS.polymers.html.
Chemspider, D-Glucose, Jun. 18, 2013, 4 pages.
Chirife et al., "A Simple Model for Predicting the Viscosity of Sugar and Oligosaccharide Solutions", J. of Food Engineering 33, pp. 221-226 (1987).
De Meireless Brioude et al., "Synthesis and Characterization of Allphatic Polyesters from Glycerol, by-Product of Biodiesel Production, and Adipic Acid", Materials Research, vol. 10, No. 4, 335-339 2007.
Dokic, et al., "Molecular characteristics of maltodextrins and rheological behaviour of diluted and concentrated solutions", Colloids and Surfaces, A: Physiocochemical and Engineering Aspects, 141, pp. 435-440 (1998).
D. Pramanick et al., "Synthesis and biodegradation of copolyesters from citric acid and glycerol", Polymer Bulletin 19, pp. 365-370 (1988).
Filton, "Rapid Determination of Dextrose Equivalent by Cryoscopy" (1979) Starch, vol. 31, issue 11, pp. 381-384.
Notice of Allowance from U.S. Appl. No. 16/026,136 dated May 17, 2021.
Office action from U.S. Appl. No. 15/964,833 dated Jun. 4, 2020.
Office action from U.S. Appl. No. 15/964,833 dated Oct. 26, 2020.
Office action from U.S. Appl. No. 15/964,833 dated May 21, 2021.
Kim et al., "Characterization of Poly(styrene-b-vinylbenzylphosphonic acid) Copolymer by Titration and Thermal Analysis", Macromolecular Research, 2007, vol. 15. No. 6, pp. 587-594.
Messina, M.J., "Legumes and soybeans: overview of their nutritional profiles and heath effects", Am. J. of clinical Nutrition, vol. 70, No. 3, pp. 439S-450S, Sep. 1999.
Signet Chemical, Glucidex Maltodextrin, Apr. 16, 2013.
Clark M. Welch, "Formaldehyde-Free Durable Press Finishing", Surfactant Science Series, vol. 94, pp. 1-32, 2001.
"Physical Properties of Dextran", Pharmacosmos, www.dextran.net/dextran-physical-properties.html, website of Pharmacosmos A/S, Holbaek, Denmark, pp. 1-3, retrieved Sep. 11, 2012.
Ronald Alan Holser, "Thermal Analysis of Glycerol Citrate/Starch Blends", Journal of Applied Polymer Science, vol. 110, pp. 1498-1508 (2008).
Soottitantawat et al., "Microencapsulation by Spray Drying: Influence of Emulsion Size on the Retention of Volatile Compounds", Food Engineering and Physical Properties, MS 20030050, Accepted May 31, 2003.
"Tate and Lyle STAR-DRI Maltodextrins & Corn Syrup Solids", manufacturer's literature, http://www.tate-lyle.co.uk, Tate & Lyle, Decatur, IL, Copyright 2005.
Declaration of Liang Chen signed May 9, 2013, 2 pgs.
Spectrus NX1100, two page fact sheet from GE Power & Water, Water & Process Technologies, Jul. 2010.
Nagata et al., "Synthesis and enzymatic degradation of regular network aliphatic polyesters", Reactive & Functional Polymers 30 (1996) pp. 165-171.
Shi et al., "Characterization of citric acid/glycerol co-plasticized thermoplastic starch prepared by melt blending", Carbohydrate Polymers 69, pp. 748-755 (2007).
Pachauri et al., "Value-added Utilization of Crude Glycerol from Biodiesel Production: a Survey of Current Research Activities", An ASABE meeting Presentation, Portland, Oregon, Jul. 9-12, 2006, Paper No. 066223.
Voit et al., "Hyperbranched and Highly Branched Polymer Architectures—Synthetic Strategies and Major Characterization Aspects", Chem. Rev. 2009, 109, pp. 5924-5973.
Jan Trenkel-Amoroso, "Synthesis, Degradation and Practical Applications of Glycerol/Citric Acid Condensation Polymer", A Thesis submitted to Oregon State University, presented Dec. 9, 2008, 66 pgs.
Unal, "Synthesis and Characterization of Branched Macromolecules for High Performance Elastomers, Fibers, and Films," Dissertation submitted to the Virginia Polytechnic Institute and State University, Nov. 16, 2005, 240 pages.
Reddy et al. "Wet Cross-Linking Gliadin Fibers with Citric Acid and a Quantitative Relationship between Cross-Linking Conditions and Mechanical Properties" J Agric. Food Chem., vol. 57, No. 1, pp. 90-98, 2009.
Reddy et al., "Citric acid cross-linking of starch films", Food Chemistry, vol. 118, pp. 702-711, 2010.
Welch et al., "Curing Agents having low or zero phosphorus content for formaldehyde free DP Finishing with Polycarboxylic Acids", Textile Chemist and Colorist Journal, vol. 25, No. 10, Oct. 1993, pp. 25-29.
Office action from U.S. Appl. No. 16/026,136 dated Dec. 3, 2020.
Office action from U.S. Appl. No. 13/187,650 dated Mar. 28, 2016.
Office action from U.S. Appl. No. 13/187,650 dated Jul. 13, 2016.
Office action from U.S. Appl. No. 13/187,650 dated Jan. 25, 2017.
Advisory Action from U.S. Appl. No. 13/187,650 dated Apr. 20, 2017.
Office action from U.S. Appl. No. 13/187,650 dated May 24, 2017.
Notice of Allowance from U.S. Appl. No. 13/187,650, dated Dec. 27, 2017.
Office action from U.S. Appl. No. 13/234,336 dated Jul. 17, 2014.
Office action from U.S. Appl. No. 13/234,336 dated Jan. 14, 2015.
Office action from U.S. Appl. No. 13/234,336 dated May 4, 2015.
Office action from U.S. Appl. No. 13/234,336 dated Dec. 15, 2015.
Office action from U.S. Appl. No. 14/110,079 dated Jan. 28, 2016.
Office action from U.S. Appl. No. 14/302,604 dated Jun. 29, 2015.
Office action from U.S. Appl. No. 14/302,604 dated Jan. 4, 2016.
Office action from U.S. Appl. No. 14/302,604 dated Jul. 12, 2016.
Office action from U.S. Appl. No. 14/302,604 dated Nov. 3, 2016.
Office action from U.S. Appl. No. 14/487,152 dated Oct. 26, 2015.

(56) References Cited

OTHER PUBLICATIONS

Notice of Allowance from U.S. Appl. No. 14/487,152 dated May 6, 2016.
Notice of Allowance from U.S. Appl. No. 14/487,152 dated Jul. 14, 2016.
Notice of Allowance from U.S. Appl. No. 14/487,152 dated Oct. 24, 2016.
Supplemental Notice of Allowance from U.S. Appl. No. 14/487,152, dated Dec. 14, 2016.
Office action from U.S. Appl. No. 14/516,660 dated May 15, 2015.
Notice of Allowance from U.S. Appl. No. 14/516,660 dated Nov. 6, 2015.
Office action from U.S. Appl. No. 14/565,545 dated Apr. 22, 2016.
Office action from U.S. Appl. No. 14/565,545 dated Jul. 27, 2016.
Office action from U.S. Serial No. 14,565,545 dated Feb. 27, 2017.
Notice of Allowance from U.S. Appl. No. 14/565,545 dated Apr. 2, 2018.
Office action from U.S. Appl. No. 15/230,721 dated Apr. 23, 2018.
Office action from Australian Application No. 2010303254 dated Oct. 10, 2014.
Patent Examination Report from Australian Application No. 2010303254 dated May 8, 2015.
Office action from Canadian Application No. 2,777,078 dated Aug. 16, 2016.
Office action from Canadian Application No. 2,828,566 dated Jan. 30, 2018.
Office action from Chinese Application No. 201110401232.4 dated Jan. 30, 2014.
Office action from Chinese Application No. 201110401232.4 dated Nov. 25, 2014.
Office action from Chinese Application No. 201080051943.7 dated Mar. 3, 2014.
Office action from Chinese Application No. 201080051943.7 dated Oct. 17, 2014.
Office action from Chinese Application No. 201080051943.7 dated Jun. 30, 2015.
Office action from Chinese Application No. 201280018294.X dated Aug. 29, 2014.
Office action from European Application No. 15152030.1 dated Apr. 8, 2015.
Office action from European Application No. 15152030.1 dated Mar. 16, 2018.
Communication from European Application No. 10768139.7 dated Apr. 7, 2015.
Search Report from European Application No. 15152030.1 dated Aug. 3, 2015.
Communication from the European Patent Office dated Aug. 16, 2005 regarding Serial No. 03768889.2.
Response to the European Patent Office dated Jul. 12, 2005 for Serial No. 03768889.2.
Communication from the European Patent Office dated Oct. 6, 2005 regarding Serial No. 03768889.2.
Response to the European Patent Office dated Feb. 3, 2006 for Serial No. 03768889.2.
Communication from European Application No. 15152030.1 dated Aug. 3, 2015.
Correspondence to the EPO from the Opponent/Respondent regarding Opposition to EP Application No. 03768889.2 (EP Patent No. 1578879) dated Feb. 14, 2013 from Opponent.
Communication from the EPO dated Nov. 8, 2012 regarding Summons to attend Oral Proceedings regarding Opposition to EP Application No. 03768889.2 (EP Patent No. 1578879).
Communication from the EPO dated Oct. 31, 2012 regarding Preparation for Oral Proceedings—Instructions to Support Service regarding Opposition to EP Application No. 03768889.2 (EP Patent No. 1578879).

* cited by examiner

BINDER COMPOSITIONS WITH POLYVALENT PHOSPHORUS CROSSLINKING AGENTS

CROSS REFERENCE TO RELATED APPLICATIONS

This application is a continuation of U.S. patent application Ser. No. 15/964,833, filed Apr. 27, 2018, which is a divisional of U.S. patent application Ser. No. 13/187,650, filed Jul. 21, 2011, now U.S. Pat. No. 9,957,409, and is related to U.S. patent application Ser. No. 12/900,540, filed Oct. 8, 2010, and its U.S. provisional patent application Ser. No. 61/250,187 entitled "Bio-Based Binders For Insulation And Non-Woven Mats" filed Oct. 9, 2009; as well as to U.S. patent application Ser. No. 12/825,375, filed Jun. 29, 2010, and its U.S. provisional patent application Ser. No. 61/221,298 entitled "Modified Starch-Based Binder" filed Jun. 29, 2009; the entire contents of each of which are expressly incorporated by reference herein.

TECHNICAL FIELD AND INDUSTRIAL APPLICABILITY OF THE INVENTION

The present invention relates generally to fibrous insulation and non-woven mats, and more particularly, to a binder for use in manufacturing fibrous mineral insulation such as fiberglass and non-woven mats that is bio-based, contains no added formaldehyde, is crosslinked through phosphate diester bonds, and is environmentally friendly.

BACKGROUND OF THE INVENTION

Conventional fibers are useful in a variety of applications including reinforcements, textiles, and acoustical and thermal insulation materials. Although mineral fibers (e.g., glass fibers) are typically used in insulation products and non-woven mats, depending on the particular application, organic fibers such as polypropylene, polyester, and multi-component fibers may be used alone or in combination with mineral fibers in forming the insulation product or non-woven mat.

Fibrous insulation is typically manufactured by fiberizing a molten composition of polymer, glass, or other mineral and spinning fine fibers from a fiberizing apparatus, such as a rotating spinner. To form an insulation product, fibers produced by the rotating spinner are drawn downwardly from the spinner towards a conveyor by a blower. As the fibers move downward, a binder material is sprayed onto the fibers and the fibers are collected into a high loft, continuous blanket on the conveyor. The binder material gives the insulation product resiliency for recovery after packaging and provides stiffness and handleability so that the insulation product can be handled and applied as needed in the insulation cavities of buildings. The binder composition also provides protection to the fibers from interfilament abrasion and promotes compatibility between the individual fibers.

In addition, previous workers have focused on the use of polyacrylic acid with a polyhydroxy crosslinking agent or carbohydrate-based chemistry that is linked to the Maillard reaction. See, e.g. U.S. Pat. No. 7,772,347 to Swift, et al. Polyacrylic acid binders, however, have several drawbacks. For example, polyacrylic acid binders use petroleum based materials and costs typically at least two times that of current phenolic binder systems. In addition, the high viscosity and different cure characteristics pose process difficulties. Also, Maillard reaction-based products have an undesirable dark brown color after curing. Further, the use of large amounts of ammonia needed to make the binder presents a safety risk and possible emission problems.

Hawkins, et al. in U.S. patent publication 2011/0021101, published Jan. 27, 2011 teach a formaldehyde-free binder comprising modified starches (which contain multiple hydroxyl groups) crosslinked with various reagents, including polycarboxylic acids (and their anhydrides and salts) such as citric, adipic, polyacrylic, and others. Generally this reaction is catalyzed by a phosphorous-containing catalyst or cure accelerator, such as sodium hypophosphite. However, Hawkins et al, fail to teach any phosphorus-containing compound as a crosslinking agent. A similar disclosure is found in Arkens, et al. U.S. Pat. No. 5,661,213, Arkens, et al, U.S. Pat. No. 6,221,973 and Taylor, et al. U.S. Pat. No. 6,331,350, but these also fail to teach any phosphorus-containing compound as a crosslinking agent.

In addition, phosphorus compounds are known as a flame or fire retardant and have been used in fibrous insulation products as such. U.S. Pat. No. 5,284,700 to Strauss, et al, and U.S. patent publication 2006/0178064 to Balthes, et al, are examples.

Finally, it is also known to use acids, including phosphoric acid, as a pH adjuster in various product binders, as is taught in U.S. Pat. No. 3,944,690 to Distler, et al., and U.S. Pat. No. 3,669,638 to Wong, et al.

In view of the existing problems with current binders, there remains a need in the art for a binder system that is not petroleum dependent, has no added formaldehyde, is bio-based and environmentally friendly, and is cost competitive.

SUMMARY OF THE INVENTION

It is an object of the present invention to provide a binder composition for use in the formation of fiberglass insulation and non-woven chopped strand mats that includes a polyol crosslinked with at least one phosphorus crosslinking agent. The polyol and crosslinking agent form a polyester thermoset resin, more specifically a phosphodiester crosslinked resin.

The polyol is polyvalent, meaning polyhydroxy or having two or more hydroxyl groups available for reaction. The polyol may be monomeric or polymeric; and may be natural or synthetic. In some embodiments, the polyol may be a water-soluble polysaccharide selected from pectin, dextrin, maltodextrin, starch, modified starch, starch derivatives and combinations thereof. The carbohydrate may have a dextrose equivalent (DE) from 2 to 20. In other embodiments, the polyol may be smaller monomeric compounds like glycerol, ethylene glycol, erythritol, pentaeythritol, or triethanoloamine (TEA), or it may be polymeric like polyvinyl alcohol, polyethylene glycol, polyol- or hydroxyl-functionalized acrylic resins, or di-, tri- and polysaccharides.

The phosphorus crosslinking agent is also polyvalent, meaning it will have two or more reactive sites. It may be selected from phosphonic acid; a salt, ester or anhydride of phosphonic acid; phosphoric acid; a salt, ester or anhydride of phosphoric acid; and mixtures thereof. With only one reactive hydroxyl, phosphinic acid and its salts and esters are generally not suitable. For example, the phosphorus crosslinking agent may have the formula I

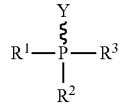

I wherein ~Y represents either a double bonded oxygen or a lone pair of electrons; $R^1$ and $R^2$ are independently selected from OH, $OR^4$, $O(CO)R^4$ or $O^-M^+$; and $R^3$ is selected from H, OH, $R^4$, $OR^4$, $O(CO)R^4$, $O^-M^+$ or $OR^5$;

wherein $R^4$ is ($C_1$-$C_5$)alkyl, ($C_1$-$C_5$)alkenyl, ($C_1$-$C_5$)alkynyl, or aryl; $M^+$ is a cation representing an ionizable salt; and $R^5$ represents 1 to 5 additional phosphonate moieties In some exemplary embodiments, the binder composition may include a catalyst, a silane coupling agent, a moisture resistance agent and/or a pH adjuster or other additives. The binder composition is free of added formaldehyde and is environmentally friendly.

The invention comprises both methods of binding fibrous materials using these binder compositions, as well as the fibrous products bound or crosslinked with phosphodiester linkages caused by use of these binder compositions.

It is another object of the present invention to provide a fibrous insulation product that includes a plurality of randomly oriented fibers and a binder composition applied to at least a portion of the fibers and interconnecting the fibers. The binder composition may be any of those described above and may also include one or more members selected from a catalyst, a coupling agent, a process aid, a crosslinking density enhancer, an extender, a moisture resistant agent, a dedusting oil, a colorant, a corrosion inhibitor, a surfactant, and a pH adjuster.

It is yet another object of the present invention to provide a non-woven chopped strand mat formed of a plurality of randomly oriented glass fibers having a discrete length enmeshed in the form of a mat having a first major surface and a second major surface and a binder composition at least partially coating the first major surface of the mat. The binder composition is as described above and may also include one or more members selected from a catalyst, a moisture resistant agent, and a pH adjuster. In at least one exemplary embodiment, the binder includes a carbohydrate polyol that is a water-soluble polysaccharide selected from pectin, dextrin, maltodextrin, starch, modified starch, starch derivatives and combinations thereof.

It is an advantage of the present invention that the carbohydrate is natural in origin and derived from renewable resources.

It is yet another advantage of the present invention that maltodextrin is readily available and is low in cost.

It is a further advantage of the present invention that insulation products and non-woven mats utilizing the inventive binder composition can be manufactured using current manufacturing lines, thereby saving time and money.

It is another advantage of the present invention that the binder composition has no added formaldehyde.

It is a further advantage of the present invention that the binder composition has a reduction in particulate emission compared to conventional phenol/urea/formaldehyde binder compositions.

It is a feature of the present invention that the maltodextrin can form an aqueous mixture that can be applied by conventional binder applicators, including spray applicators.

It is a further feature of the present invention that the binder can be acidic, neutral, or even basic in the case of an ammonium salt of a phosphorus-based crosslinking agent.

It is another feature of the present invention that the inventive insulation products and non-woven mats have no added formaldehyde.

It's also a feature of the invention that the inventive binder composition can be useful for composite reinforcements, such as chopped strands, for use in thermoplastics, thermosets, and roofing applications. In addition, the inventive binders may be used in both single and multi-end rovings.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

It is to be noted that the phrase "binder", "bio-based binder", "binder composition", and "binder formulation" may be used interchangeably herein. "Crosslinking agent," unless context dictates otherwise, means a polyvalent phosphorus-based crosslinking agent, such as one based on phosphorous acid, phosphonic acid or phosphoric acid, or having one or more of those functional moieties.

The present invention relates to environmentally friendly, aqueous phosphodiester binder compositions that contain at least one polyol and at least one polyvalent phosphorus crosslinking component; and to fibrous products manufactured with such a binder composition; and to methods of manufacture.

Polyol Component

By definition, the polyol is polyvalent, meaning polyhydroxy or having two or more hydroxyl groups that can be available for reaction. While a polyol has a minimum of two hydroxyl groups, there is no theoretical maximum number of hydroxyl groups. Diols, triols, tetraols, penta-ols, hexa-ols and higher polyols are all encompassed, particularly in polymeric compounds. The polyol may be monomeric or polymeric; and may be natural or synthetic. In some embodiments, the polyol may be smaller monomeric compounds like glycerol, ethylene glycol, propanediols, propanetriols, trimethylol propane, erythritol or other butane-based polyols, pentaeythritol, triethanoloamine (TEA), or 1,2,6-hexane-triol; or any monosaccharide having at least 4 carbons, including pentoses, and hexoses, including, but not limited to erythrose, erythulose, threose, ribose, ribulose, arabinose, xylose, xylulose, glucose, dextrose (or D-glucose), mannose, glactose, fructose, and sorbose. All isomeric and stereochemical forms of these monosaccharides are encompassed in the invention. Furthermore, derivatives of saccharides may also be suitable, provided they retain their polyvalent polyol nature after derivatization. Thus, the polyol may include O-glycosides, N-glycosides, O-alkyl (e.g. methyl, ethyl), O-acylated sugars, amino sugars, sugar alcohols (like sorbitol, xylitol, erythritol, etc.) and the like.

In other embodiments, the polyol may be a synthetic or naturally occurring polymer, such as polyvinyl alcohol, poly(ether) polyols, poly(ester) polyols, polyethylene glycol, polyol- and hydroxy-functional acrylic resins such as JONCRYL® (BASF Resins), MACRYNAL® (Cytec Industries) PARALOID® (Dow Coating Materials), G-CURE®, TSAX® and SETALUX® (Nuplex Resins, LLC) in solution or emulsion form; or di-, tri- and higher polysaccharides. Some common exemplary disaccharides include maltose, sucrose, lactose, cellobiose and trehalose. Other polysaccharides include polysaccharides selected from pectin, dextrin, maltodextrin, starch, modified starch, starch derivatives, glycans, dextrins, fructans, chitin and combinations thereof that can be dispersed in water. Dispersions in water include emulsions, suspensions, colloids and true solutions. When used, a polysaccharide may have a dextrose equivalent (DE) from 2 to 20.

Due to the wide variability in molecular weights of the polyol component and (as discussed below) the crosslinking agent, the weight ratios of the various components of the binder composition can vary tremendously. Thus, polyol component may be present in the binder composition in an amount from about 1% to about 99% by weight of the total solids in the binder composition, more likely from about 20% to about 99% by weight of the total solids in the binder composition. As used herein, % by weight indicates % by weight of the total solids in the binder composition.

In some exemplary embodiments, the saccharide polyol component is a carbohydrate and the binder and includes a carbohydrate and a crosslinking agent. In some exemplary embodiments, the carbohydrate-based binder composition also includes a coupling agent, a process aid agent, an extender, a pH adjuster, a catalyst, a crosslinking density enhancer, a deodorant, an antioxidant, a dust suppressing agent, a biocide, a moisture resistant agent, or combinations thereof. The binder may be used in the formation of insulation materials and non-woven chopped strand mats. In addition, the binder is free of added formaldehyde. Further, the binder composition has a reduction in particulate emission compared to conventional phenol/urea/formaldehyde binder compositions. The inventive binder may also be useful in forming particleboard, plywood, and/or hardboards.

In one or more exemplary embodiment, the binder includes at least one carbohydrate that is natural in origin and derived from renewable resources. For instance, the carbohydrate may be derived from plant sources such as legumes, maize, corn, waxy corn, sugar cane, milo, white milo, potatoes, sweet potatoes, tapioca, rice, waxy rice, peas, sago, wheat, oat, barley, rye, amaranth, and/or cassava, as well as other plants that have a high starch content. The carbohydrate polymer may also be derived from crude starch-containing products derived from plants that contain residues of proteins, polypeptides, lipids, and low molecular weight carbohydrates. The carbohydrate may be selected from monosaccharides (e.g., xylose, glucose/dextrose, and fructose), disaccharides (e.g., sucrose, maltose, and lactose), oligosaccharides (e.g., glucose syrup and fructose syrup), and polysaccharides (e.g., pectin, dextrin, maltodextrin, starch, modified starch, and starch derivatives), provided they can be prepared as water dispersions, which includes emulsions, suspensions, colloids and true solutions.

The carbohydrate polymer may have a number average molecular weight from about 1,000 to about 8,000. Additionally, the carbohydrate polymer may have a dextrose equivalent (DE) number from 2 to 20, from 7 to 11, or from 9 to 14. The carbohydrate dispersions beneficially have a low viscosity and cure at moderate temperatures (e.g., 80-250° C.) alone or with additives. The low viscosity enables the carbohydrate to be utilized in a binder composition. In exemplary embodiments, the viscosity of the carbohydrate dispersion may be lower than 500 cps at 50% concentration and between 20 and 30° C. The use of a carbohydrate in the inventive binder composition is advantageous in that carbohydrates are readily available or easily obtainable and are low in cost.

In at least one exemplary embodiment, the carbohydrate is a water-soluble polysaccharide such as dextrin or maltodextrin. The carbohydrate polymer may be present in the binder composition in an amount from about 40% to about 95% by weight of the total solids in the binder composition, from about 50% to about 95% by weight of the total solids in the binder composition, from about 60% to about 90%, or from about 70% to about 85%.

Polyvalent Phosphorus Component

A polyvalent phosphorus compound serves as a crosslinking agent. A polyvalent phosphorus crosslinker compound may be represented by formula I:

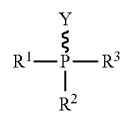

I wherein ~Y represents either a double bonded oxygen (=O) or a lone pair of electrons; $R^1$ and $R^2$ are independently selected from OH, $OR^4$, $O(CO)R^4$ or $O^-M^+$; and $R^3$ is selected from H, OH, $R^4$, $OR^4$, $O(CO)R^4$, $O^-M^+$ or $OR^5$;

wherein $R^4$ is selected from $(C_1\text{-}C_5)$alkyl, $(C_1\text{-}C_5)$alkenyl, $(C_1\text{-}C_5)$alkynyl, or aryl; $M^+$ is a cation representing an ionizable salt; and wherein $R^5$ represents 1 to 5 additional phosphonate moieties; or a polymeric backbone of 1-20 carbons between phosphonate moieties.

As used herein, the term "$(C_1\text{-}C_5)$alkyl" refers to a straight-chain and branched non-cyclic saturated hydrocarbon having from 1 to 5 carbon atoms. Representative straight chain —$(C_1\text{-}C_5)$alkyl groups include methyl, -ethyl, -n-propyl, -n-butyl, and -n-pentyl. Representative branched-chain —$(C_1\text{-}C_5)$alkyl groups include isopropyl, sec-butyl, isobutyl, tert-butyl, isopentyl, neopentyl, 1-methylbutyl, 2-methylbutyl, 3-methylbutyl, 1,1-dimethylpropyl, and 1,2-dimethylpropyl.

As used herein, the term "$(C_2\text{-}C_5)$alkenyl" refers to straight chain and branched non-cyclic hydrocarbons having from 2 to 5 carbon atoms and including at least one carbon-carbon double bond. Representative straight chain and branched —$(C_2\text{-}C_5)$alkyenyl groups include -vinyl, -allyl, -1-butenyl, -2-butenyl, -isobutylenyl, -1-pentenyl, -2-pentenyl, -3-methyl-1-butenyl, and -2-methyl-2-butenyl.

As used herein, the term "—$(C_2\text{-}C_5)$alkynyl" refers to straight chain and branched non-cyclic hydrocarbons having from 2 to 5 carbon atoms and including at least one carbon-carbon triple bond. Representative straight chain and branched —$(C_2\text{-}C_5)$alkynyl groups include -acetylenyl, -propynyl, -1 butynyl, -2-butynyl, -1-pentynyl, -2-pentynyl, -3-methyl-1-butynyl, and -4-pentynyl.

As used herein, the term "-aryl" refers to phenyl; phenyl optionally substituted with up to three groups independently selected from $(C_1\text{-}C_5)$alkyl, $(C_1\text{-}C_5)$alkenyl, $(C_1\text{-}C_5)$alkynyl, hydroxyl, amino, nitro, or halo groups.

As used herein, the term "phosphonate moiety" refers to —P(O)(OH)O—, optionally terminated by H or a cation; also represented as the portion within the brackets in structure C in Table 1 below.

It should be recognized that formula I represents several types of phosphorus-containing crosslinking agents: (a) phosphorous acid and its phosphite derivatives when Y is a lone pair of electrons, as shown by structure A in Table 1 below; (b) phosphonic acid and its phosphonate derivatives when X is =O, $R^1$ and $R^2$ are both OH and $R^3$ is H or $R^4$ or other possibilities (see structure B); (c) phosphoric acid and its phosphate derivatives when X is =O and $R^1$, $R^2$ and $R^3$ are all OH (see structure B); (d) polyphosphoric acids when X is =O, $R^1$ and $R^2$ are OH, $R^3$ is $OR^5$, and $R^5$ is additional phosphonate moieties (see structure C, wherein n represents an integer from 1 to 6); and (e) polymeric phosphonates when X is =O, $R^1$ and $R^2$ are OH, $R^3$ is $OR^5$, and $R^5$ is a polymeric backbone of 1-20 carbons (see structure D, representing a dimer). Such polymeric backbones have been prepared from styrene monomers by Kim, et al, Characterization of Poly(styrene-b-vinylbenzylphosphonic acid) Copolymer by Titration and Thermal Analysis, Macromolecular Research, Vol. 15, No. 6, pp 587-594 (2007), which is incorporated herein by reference. The backbone may be akyl, alkenyl, or aryl, or mixed; it may include substitutions and linkers with atoms and moieties like oxygen, carbonyl, and amines to improve synthesis and solubility, if desired.

TABLE 1

Representative phosphorus structures

A

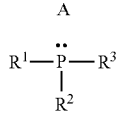

B

TABLE 1-continued

Representative phosphorus structures

C where n is an integer from 1 to 5

D

Note that the lone pair of electrons (represented by the two dots in Structure A) and the double bonded oxygen exert their presence to make these molecules generally tetrahedral about the phosphorus atom and, apart from that asymmetry, substituents at $R^1$, $R^2$ and $R^3$ are all equivalent positions. Table 2 offers some exemplary substituents for base formulas.

TABLE 2

Exemplary substituents and conventional nomenclature (not all are polyvalent)

| | $R^1$ | $R^2$ | $R^3$ | Name(s) |
|---|---|---|---|---|
| | $OR^4$ | $OR^4$ | H or $R^4$ | phosphonite |
| $H_3PO_3$ | OH | OH | OH | phosphorous acid or |
| | OH | $O^-M^+$, $OR^4$ or $OC(O)R^4$ | OH | orthophosphorous acid, but also phosphonic acid since this |
| | $O^-M^+$, $OR^4$ or $OC(O)R^4$ | $O^-M^+$, $OR^4$ or $OC(O)R^4$ | OH | tautomerically rearranges to a dihydroxy form (see $H_3PO_3$ below); phosphites |
| | OH | OH | $OR^5$ | |
| $H_3PO_2$ (not polyvalent) | H or $R^4$ | OH | H or $R^4$ | phosphinic acid hypophosphorous acid, but see above re nomenclature confusion |
| (not polyvalent) | H or $R^4$ | $O^-M^+$, $OR^4$ or $OC(O)R^4$ | H or $R^4$ | phosphinate hypophosphite |
| $H_3PO_3$ | OH | OH | H or $R^4$ | phosphonic acid or orthophosphorous acid |
| | $O^-M^+$, $OR^4$ or $OC(O)R^4$ | $O^-M^+$, $OR^4$ or $OC(O)R^4$ | H or $R^4$ | phosphonates, sometimes also phosphites (salt, ester or anhydride) |
| | OH | OH | $OR^5$ where $R^5$ is polymeric backbone | polyphosphoric acid |
| $H_3PO_4$ | OH | OH | OH | phosphoric acid |
| | $O^-$ | $O^-$ | $O^-$ | phosphate ion (−3 uncommon) |
| | $O^-$ | $O^-$ | $OR^4$ | phosphate ester ion (−1, −2) |
| | $OR^4$ | $O^-$ | $OR^4$ | |
| | $O^-M^+$, $OR^4$ or $OC(O)R^4$ | $O^-M^+$, $OR^4$ or $OC(O)R^4$ | $OR^4$ | phosphate salt, ester or anhydride |

TABLE 2-continued

Exemplary substituents and conventional nomenclature (not all are polyvalent)

| $R^1$ | $R^2$ | $R^3$ | Name(s) |
|---|---|---|---|
| OH | OH | $OR^5$ where $R^5$ is additional phosphonate moieties | polyphosphoric |

As seen from Table 2 above, the polyvalent forms of phosphorus include $H_3PO_3$ (both valency states: i.e. phosphorous acid and phosphonic acid) and $H_3PO_4$ (phosphoric acid), as well as salts, esters, anhydrides and various derivatives of these. Phosphinic or hypophosphorous acid and its derivatives are not polyvalent.

Salts are formed when one or more hydrogen atoms are dissociated from hydroxyl group(s) and are replaced by a cation ($M^+$). Depending on the charge of the cation, there may be one or two phosphorus complexes per cation. Classic salts formed by alkali metals like sodium, potassium, calcium or magnesium do not perform as well as the ammonium salts, formed by the cation $N^+R^3$, wherein each R is independently selected from H, ($C_1$-$C_5$)alkyl (alkylamines) or ($C_1$-$C_5$)alkyl substituted with hydroxyl (alkanolamines). Preferred ammonium salts can be formed with primary, secondary or tertiary amines. It may be particularly useful to utilize alkanolamines, since the hydroxyl function of these cations may provide crosslinking density enhancement (discussed below).

Phosphoesters are formed when one or more hydrogen atoms are dissociated from hydroxyl group(s) and are replaced by alkoxy groups, (RO—). Anhydrides are formed when one or more hydrogen atoms are dissociated from hydroxyl group(s) and are replaced by acyl groups, (RC(O)—).

The polyvalent phosphorus crosslinking agent has a number average molecular weight greater than 80, from about 80 to about 24,000, or from about 80 to about 300 in the case of monomeric phosphorus crosslinkers; and from about 200 to about 24,000 in the case of polymeric phosphorus crosslinkers. In some exemplary embodiments, the crosslinking agent has a number average molecular weight less than about 1000. Non-limiting examples of suitable crosslinking agents include phosphoric acid, ammonium phosphate, ammonium phosphonate, and polyphosphoric acid.

The crosslinking agent may be present in the binder composition in an amount from about 1% to about 99% by weight of the binder composition. The wide range is due, in part, to the broad variability in molecular weights of both the polyol and the phosphorus crosslinking agent. In exemplary embodiments, the crosslinking agent may be present in the binder composition in an amount from about 1% to about 40% by weight of the total solids in the binder composition or from about 1% to about 20% by weight. For example, when the polyol is a maltodextrin polyol with a DE for 2-10 and the polyvalent crosslinking agent is a small molecule (e.g. phosphoric acid, phosphonic acid, phosphorous acid or polyphosphoric acid), the polyol component may be present in an amount from about 60% to about 95% while the phosphorus crosslinking agent may be present in an amount from about 5% to about 40% of the total solids weight.

Optionally, the binder composition may include a catalyst to assist in the crosslinking, however, an advantage of the present invention is that no catalyst is required. If desired, optional catalysts may include inorganic salts, Lewis acids (i.e., aluminum chloride or boron trifluoride), Bronsted acids (i.e., sulfuric acid, p-toluenesulfonic acid and boric acid) organometallic complexes (i.e., lithium carboxylates, sodium carboxylates), Lewis bases (i.e., polyethyleneimine, diethylamine, or triethylamine); and/or an alkali metal salt of a phosphorus-containing organic or inorganic acid (e.g. sodium hypophosphite), or any catalyst described further in the literature, including U.S. patent application Ser. No. 12/900,540.

The catalyst or cure accelerator, when used, may be present in the binder composition in an amount from about 0.5% to about 10% by weight of the total solids in the binder composition, or from about 2.0% to about 8.0% by weight, or from about 3.0% to about 6.0% by weight.

The binder composition may optionally contain at least one coupling agent. In at least one exemplary embodiment, the coupling agent is a silane coupling agent. The coupling agent(s) may be present in the binder composition in an amount from about 0.01% to about 5.0% by weight of the total solids in the binder composition, from about 0.01% to about 2.5% by weight, or from about 0.1% to about 0.5% by weight. Non-limiting examples of silane coupling agents that may be used in the binder composition may be found in the literature, including U.S. patent application Ser. No. 12/900,540.

In addition, the binder composition may include a process aid in addition to the carbohydrates described above. The process aid is not particularly limiting so long as the process aid functions to facilitate the processing of the fibers formation and orientation. The process aid can be used to improve binder application distribution uniformity, to reduce binder viscosity, to increase ramp height after forming, to improve the vertical weight distribution uniformity, and/or to accelerate binder de-watering in both forming and oven curing process. The process aid may be present in the binder composition in an amount from about 0% to about 25.0% by weight, from about 1.0% to about 20.0% by weight, or from about 5.0% to about 15.0% by weight.

Examples of processing aids include viscosity modifiers and defoaming agents (e.g., emulsions and/or dispersions of mineral, paraffin, or vegetable oils, dispersions of polydimethylsiloxane (PDMS) fluids and silica which has been hydrophobized with polydimethylsiloxane or other materials, and particles made of amide waxes such as ethylenebisstearamide (EBS) or hydrophobized silica). A further process aid that may be utilized in the binder composition is a surfactant. One or more surfactant may be included in the binder composition to assist in binder atomization, wetting, and interfacial adhesion. Surfactants are not particularly limiting and are described in the literature, including U.S. patent application Ser. No. 12/900,540.

The binder composition may optionally include a corrosion inhibitor to reduce or eliminate any potential corrosion to the process equipment. The corrosion inhibitor may be present in the binder composition in an amount from about 0% to about 15.0% by weight, from about 1.0% to about 5.0% by weight, or from about 0.2% to about 1.0% by weight.

Also, the binder composition may also contain one or more biocide to reduce or eliminate mold and fungal growth on the fiberglass product. The biocide may be present in the binder composition in an amount from about 0% to about 10.0% by weight, from about 0.05% to about 1.0% by weight, or from 0.1% to about 0.5% by weight.

In some embodiments, a higher degree of crosslinking is desired, such as for improving stiffness or insulation R-value. In such cases, the binder composition may optionally include a crosslinking density enhancer to improve the degree of crosslinking of the polyol-based phosphodiester binder. Crosslinking density enhancement can be achieved by at least two mechanism: (a) increasing esterification between the functional hydroxyl and polyvalent phosphorus component and/or (b) introducing free radical linkages to improve the strength of the thermoset resin. The esterification crosslinking density can be adjusted by selecting polyols and/or polyvalent phosphorus crosslinking agents that include a more functional moieties per weight; by altering the ratio between hydroxyl and polyvalent phosphorus component; and/or adding additional esterifiable functional groups such as triethanolamine, diethanolamine, mono ethanolamine, 1-amino-2-propanol, 1,1'-aminobis,-2-propanol, 1,1,'1"nitrilotri-2-propanol, 2-methylaminoethanol, 2-dimethylaminoethanol, 2-(2-aminoethoxy)ethanol, 2 {(2-aminoethyl)amino}ethanol, 2-diethylaminoethanol, 2-butylaminoethanol, 2-dibutylaminoethanol, 2cyclohexylamincethanol, 2,2'-(methylamino)bis-ethanol, 2,2'-(butylamino)bis-ethanol, 1-methylamino-2propanol, I-dimethylamino-2-propanol, 1-(2-aminoethylamino)-2-propanol, 1,1'-(methylimino)bis-2-propanol, 3-amino-1-propanol, 3-dimethylamino-1propanol, 2-amino-1-butanol, 1-ethylamino-2-butanol, 4-diethylamino-1-butanol, 1-diethylamino-2-butanol, 3-amino-2,2-dimethyl-1-propanol, 2,2-dimethyl-3-dimethylamino-1-propanol, 4-diethylamino-2-butyn-1-ol, 5-diethylamino-3-pentyne-2-ol, bis (2-hydroxypropyl)amine, as well as other alkanolamines, their mixtures, and their polymers.

The other method to enhance crosslinking density is to use both esterification and a free radical reaction for the crosslinking reactions, to form an interpenetrating polymer. A simple free radical reaction is illustrated by the adduct formed across the double bonds of alkenes, such as the vinyl moiety. Thus, vinyl or styrene substituents or polymers bearing the polyvalent phosphorus are capable of enhancing crosslinking density. Chemicals that can be used for both esterification and free radical reactions include maleic anhydride, maleic acid, or itaconic acid. The crosslinking density enhancer, when used, may be present in the binder composition in an amount from about 0.5% to about 25.0% by weight, from about 1.0.0% to about 20.0% by weight, or from about 5.0% to about 15.0% by weight.

The binder may also include organic and/or inorganic acids and bases in an amount sufficient to adjust the pH to a desired level. The pH may be adjusted depending on the intended application, or to facilitate the compatibility of the ingredients of the binder composition. Although phosphorus acids are already very acidic, some pH adjusters may be utilized to adjust the pH of the binder composition to an acidic pH. Examples of suitable acidic pH adjusters include sulfuric acid and p-toluenesulfonic acid and their corresponding salts. Alternatively, for pH adjustment toward the basic side, organic and/or inorganic bases, such sodium hydroxide, ammonium hydroxide, and diethylamine, and any kind of primary, secondary, or tertiary amine (including alkanol amine), can be used. Ammonium salts help move the acidic phosphorus crosslinkers toward neutral or basic pH; and can be used to balance pH to values between 2 and 9. The pH of the binder composition, when in an acidic state, may range from about 1 to about 6, and in some exemplary embodiments, from about 1 to about 3, including all amounts and ranges in between. The pH adjuster in an acidic binder composition may be present in the binder composition in an amount sufficient to obtain the desired pH.

The binder composition may also contain a moisture resistance agent, such as a alum, aluminum sulfate, latex, a silicon emulsion, a hydrophobic polymer emulsion (e.g., polyethylene emulsion or polyester emulsion), and mixtures thereof. In at least one exemplary embodiment, the latex system is an aqueous latex emulsion. The latex emulsion includes latex particles that are typically produced by emulsion polymerization. In addition to the latex particles, the latex emulsion may include water, a stabilizer such as ammonia, and a surfactant. The moisture resistance agent may be present in the binder composition in an amount from 0% to about 20% by weight of the total solids in the binder composition, from about 5.0% to about 10% by weight, or from about 5.0% to about 7.0% by weight.

Additionally, the binder may contain a dust suppressing agent to reduce or eliminate the presence of inorganic and/or organic particles which may have adverse impact in the subsequent fabrication and installation of the insulation materials. The dust suppressing agent can be any conventional mineral oil, mineral oil emulsion, natural or synthetic oil, bio-based oil, or lubricant, such as, but not limited to, silicone and silicone emulsions, as well as any petroleum or non-petroleum oil with a high flash point to minimize the evaporation of the oil inside the oven.

In addition, the binder may optionally include at least one extender to improve the binder's appearance and/or to lower the overall manufacturing cost. The extender can be an inorganic filler, such as tin oxide or talc or organic materials such as lignin, lignin sulfonate, or a protein-based biomass. In exemplary embodiments, the extender is a protein-containing biomass. Like the carbohydrate, the protein-containing biomass is natural in origin and is derived from renewable resources. For instance, the protein may be derived from plant sources such as soy (e.g., a soy flour), peanuts, sunflowers, kidney beans, walnuts, or from other plants that have a high protein content. Alternatively, the protein may come from animal sources such as, but not limited to, eggs, blood, and animal tissue (e.g., beef, pork, or chicken, as well as fish). The protein-containing biomass may contain up to about 95% protein, and in exemplary embodiments, up to 90%, 75%, or 50% protein. As used herein, the term "protein" may be defined as a macromolecule composed of one or more polypeptides and includes any combination of polypeptides regardless its amino acid sequence. In addition, the term "protein" is intended to include all possible structures in which a protein can be obtained naturally or a protein that has been modified to improve its reactivity. It is to be appreciated that derivatives of natural proteins and synthetic proteins are also included within the scope of the term "protein". In one or more exemplary embodiment, the protein-containing biomass is soy flour. The extender may be present in the binder composition in an amount from about 0% to about 70.0% by weight of the total solids in the binder composition, from about 5.0% to about 50.0% by weight, or from about 10.0% to about 40.0% by weight.

The binder may optionally contain conventional additives such as, but not limited to dyes, pigments, fillers, colorants, UV stabilizers, thermal stabilizers, anti-foaming agents, anti-oxidants, emulsifiers, preservatives (e.g., sodium benzoate), corrosion inhibitors, and mixtures thereof. Other additives may be added to the binder composition for the improvement of process and product performance. Such additives include lubricants, wetting agents, surfactants, antistatic agents, and/or water repellent agents. Additives may be present in the binder composition from trace amounts (such as <about 0.1% by weight the binder composition) up to about 10.0% by weight of the total solids in the binder composition. In some exemplary embodiments, the additives are present in an amount from about 0.1% to about 5.0% by weight of the total solids in the binder composition, from about 1.0% to about 4.0% by weight, or from about 1.5% to about 3.0% by weight.

The binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers. In particular, the binder composition may contain water in an amount from about 50% to about 98.0% by weight of the total solids in the binder composition.

The binder composition may be made by dissolving or dispersing the crosslinking agent in water to form a mixture. Next, the polyol may be mixed with the crosslinking agent in the mixture to form the binder composition. If desired, a cure accelerator (i.e., catalyst) may be added to the binder composition, as well as other possible additives. The binder composition may be further diluted with water to obtain a desired amount of solids. If necessary, the pH of the mixture may be adjusted to the desired pH level with organic and inorganic acids and bases.

The binder composition may be applied to fibrous products in an amount from about 1% to 40% by weight of the total fibrous product, depending on the nature and use of the product. Binder content of the fibrous products is typically measured by loss on ignition or "LOI" of the cured product. For some lighter weight insulation products, such as residential insulation, the binder content may be from about 1% to about 15% by weight LOI; or from about 2% to about 12%. For other products, such as higher density industrial and commercial products, more binder may be applied, for example from about 2% to about 40% by weight LOI; more usually from about 2% to about 20% or from about 3% to about 20%.

Fibrous Products with Phosphorus-Based Binders

The manufacture of glass fiber insulation products is well characterized in the patent literature and need not be described here. See, for example, Hawkins, et al. in U.S. patent publication 2011/0021101, published Jan. 27, 2011, which in incorporated herein in its entirety.

In one exemplary embodiment, the binder composition is used to form a fibrous product, typically an insulation product. Fibrous products are generally formed of matted inorganic fibers bonded together by a cured thermoset polymeric material. Examples of suitable inorganic fibers include glass fibers, wool glass fibers, and ceramic fibers. Optionally, other reinforcing fibers such as natural fibers and/or synthetic fibers such as polyester, polyethylene, polyethylene terephthalate, polypropylene, polyamide, aramid, and/or polyaramid fibers may be present in the insulation product in addition to the glass fibers. The term "natural fiber" as used in conjunction with the present invention refers to plant fibers extracted from any part of a plant, including, but not limited to, the stem, seeds, leaves, roots, or phloem. Examples of natural fibers suitable for use as the reinforcing fiber material include basalt, cotton, jute, bamboo, ramie, bagasse, hemp, coir, linen, kenaf, sisal, flax, henequen, and combinations thereof. Insulation products may be formed entirely of one type of fiber, or they may be formed of a combination of types of fibers. For example, the insulation product may be formed of combinations of various types of glass fibers or various combinations of different inorganic fibers and/or natural fibers depending on the desired application for the insulation. The embodiments described herein are with reference to insulation products formed primarily of glass fibers.

The term "fibrous products" is general and encompasses a variety of compositions, articles of manufacture, and manufacturing processes. "Fibrous products" may be characterized and categorized by many different properties; density for example, which may range broadly from about 0.2 pounds/cubic foot ("pcf") to as high as about 10 pcf, depending on the product. Low density flexible insulation batts and blankets typically have densities between about 0.2 pcf and about 5 pcf, more commonly from about 0.3 to about 4 pcf. Fibrous products also include higher density products having densities from about 1 to about 10 pcf, more typically from about 2 or 3 pcf to about 8 pcf, such as boards and panels or formed products. Higher density insulation products may be used in industrial and/or commercial applications, including but not limited to metal building insulation, pipe or tank insulation, insulative ceiling and wall panels, duct boards and HVAC insulation, appliance and automotive insulation, etc.

Another property useful for categorization is the rigidity of the product. Residential insulation batts are typically quite flexible and they can be compressed into rolls or batts while recovering their "loft" upon decompression. In contrast, other fibrous products, such as ceiling tiles, wall panels, foundation boards and certain pipe insulation to mention a few, are quite rigid and inflexible by design. These products will flex very little and are unlikely to be adapted or conformed to a particular space.

Shape is another important property. Some fibrous products are flexible, as noted and can be forced to assume conforming shapes, while other are formed and shaped for a specific purpose. In some embodiments, the shape is substantially planar, as in duct boards, ceiling tiles and some wall insulation. In other embodiments, the fibrous insulation product is manufactured with a particular shape (e.g. cylindrical) suitable for a particular size conduit, pipe or tank. In other cases, specific shapes and cutouts, often die-cut, are included in certain appliance insulation products, automotive insulation products and the like. Finally, other shapes may be created with nonwoven textile insulation products.

Other classifications of fibrous insulation products can include the method of manufacture. The manufacture of glass fiber insulation may be carried out in a continuous process by rotary fiberization of molten glass, immediately forming a fibrous glass pack on a moving conveyor. The glass fibers, while in transit in the forming chamber to the conveyor and while still hot from the fiberization operation, are sprayed with the inventive aqueous binder composition so as to result in a distribution of the binder composition throughout the formed insulation pack of fibrous glass. Cooling water may also be applied to the glass fibers in the forming chamber prior to the application of the aqueous binder composition.

The fibrous insulation pack is then heated, such as by a curing oven where heated air is blown through the insulation pack to evaporate any remaining water in the binder, cure the binder, and rigidly bond the fibers together. The cured binder imparts strength and resiliency to the insulation blanket. It is to be appreciated that the drying and curing of the binder may be carried out in either one or two different steps. The two stage (two-step) process is commonly known as B-staging.

A significant portion of the insulation placed in the insulation cavities of buildings is in the form of insulation blankets rolled from insulation products such as is described above. Faced insulation products are installed with the facing placed flat on the edge of the insulation cavity, typically on the interior side of the insulation cavity. Insulation products where the facing is a vapor retarder are commonly used to insulate wall, floor, or ceiling cavities that separate a warm interior space from a cold exterior space. The vapor retarder is placed on one side of the insulation product to retard or prohibit the movement of water vapor through the insulation product.

Formed or shaped products may include a further step, optionally during cure, that molds or shapes the product to its specific final shape. Rigid boards are a type of shaped product, the shape being planar. Other shaped products may be formed by dies or molds or other forming apparatus. Rigidity may be imparted by the use of higher density of fibers and/or by higher levels of binder application. As an alternative to rotary fiberizing, some fibrous insulation products, particularly higher density, non-woven insulation products, may be manufactured by an air-laid or wet-laid process using premade fibers of glass, other minerals or polymers that are scattered into a random orientation and contacted with binder to form the product.

In another embodiment of manufacture, the binder composition may be used in combination with pre-manufactured fibers to form a non-woven chopped strand mat. In particular, binder is added during the formation of the chopped strand mat in a wet-laid or air-laid mat processing line, where the fibers are dispersed by a water (or air) fluid. It is to be appreciated that reference is made herein to glass fibers, although the chopped strand mat could be formed of, or include, non-glass fibers. Air laid and wet-laid processes are well known to those skilled in the art. The inventive binder composition is applied to the web by a suitable binder applicator, such as a spray applicator or a curtain coater. As with rotary fiberization, once the binder has been applied to the mat, the binder coated mat is passed through at least one drying oven to remove any remaining water and cure the binder composition. The formed non-woven chopped strand mat that emerges from the oven is an assembly of randomly oriented, dispersed, individual glass fibers. The chopped strand mat may be rolled onto a take-up roll for storage for later use. The non-woven mat can be use in roofing, flooring, ceiling, wall applications, as filters, in ground based vehicles, and in aircraft.

Whereas examples 4, 5, 7, and 12 below relate to flexible, light density residential insulation, examples 8, 9 and 10 further illustrate commercial fibrous products other than the typical flexible residential insulation. A more complete listing of non-residential insulation fibrous products that can be manufactured using the binder composition according to the invention is set forth in Table 3, below.

TABLE 3

Selected Commercial and Industrial Fibrous Products which may use a Phosphorus-Based Binder

| | Rigid Boards | Flexible, Light Density Insulation | Rigid Pipe Insulation and pipe rolls | Textile E-glass Nonwoven |
|---|---|---|---|---|
| Density | Wide range of densities- from 1.5 to 10 pcf | Light density - Ranging from 0.3 to 4.0 pcf | Ranging from 3-6 pcf | Ranging from 0.8 to 4 pcf |
| Binder content | about 2 to about 20% LOI | about 2 to about 13% LOI | about 3 to about 15% LOI | about 5 to about 20% LOI |
| Manufacturing method | Rotary fiber forming process | Rotary fiber forming process | Rotary fiber forming process plus on or offline molding/pipe formation process | Air-laid nonwoven process |
| Exemplary Owens Corning Products | QUIET R Duct Board QUIET R Duct Liner Board 700 Series Insulation Insul-Quick Insulation SCR Insulation Board Curtainwall QuietZone Shaftwall Warm-N-Dri Energy Board TremDrain Exterior Foundation Barrier Board Ceiling Board Blanks | Certified R Metal Building Insulation ELAMINATOR ® Pre-Engineered Metal Roof Insulation MBI Plus Metal Bldg Utility Blanket Unfaced Metal Building Insulation for Canada Flexible Duct Media Insulation QUIET R Rotary Duct Liner SOFTR Duct Wrap FRK TIW Types I and II FLEX-Wrap for pipes and tanks H2V Series RA Series Select Sound Thermorange FlameSpread 25 Sonobatts Thermal Batts | EVOLUTION Paper-Free ASJ VAPORWICK Insulation FIBERGLAS ™ Pipe and Tank Insulation rolls | QUIET R Textile Duct Liner DURAFLEX Transportation |

There are numerous advantages provided by the inventive binder formulations. For example, they may be used with a saccharide or carbohydrate polyol of natural origin and derived from renewable resources. By lowering or eliminating formaldehyde emission, the overall volatile organic compounds (VOCs) emitted in the workplace are reduced. Additionally, because carbohydrates are relatively inexpensive, the insulation product or chopped fiber mat can be manufactured at a lower cost. Further, the binder has low to no odor, making it more desirable to work with.

Having generally described this invention, a further understanding can be obtained by reference to certain specific examples illustrated below which are provided for purposes of illustration only and are not intended to be all inclusive or limiting unless otherwise specified.

EXAMPLES

Example 1-14 are incorporated from U.S. patent application Ser. No. 12/900,540, filed Oct. 8, 2010, incorporated herein.

Examples 15-16: Binder Preparations with Citric Acid Crosslinkers

The binder compositions set forth in Table 4 were prepared according to the following general procedure. Cross-linking agents were dissolved or dispersed in water to form a dispersion. The polyol was then mixed into the dispersion to form the binder composition. In some formulations, a cure accelerator (i.e., catalyst) was added, as well as other additives as set forth in Table 4. The binder composition is further diluted with water to obtain a desired amount of solids. The pH was measured and given in Table 4.

TABLE 4

Binder recipes (weight in percent, except total weight in grams)

| Component | Example 15 (Control) | Example 16 |
|---|---|---|
| Maltodextrin (as polyol) | 6.52 | 5.51 |
| Crosslinker | Citric Acid 1.63 | Citric Acid 1.63 85% Phosphoric Acid 1.10 |
| Catalyst (50% SHP) | 0.64 | 0.39 |
| gamma-aminopropyl-trihydroxy-silane (2% solution) | 1.29 | 1.45 |
| Water | 89.92 | 89.92 |
| Total (g) | 800 | 800 |
| pH observed | 1.9 | 1.57 |

Examples 17-20: Binder Preparations with Phosphorus Crosslinkers

The binder compositions set forth in Table 5 were prepared according to the general procedure of Examples 15-16. The pH was measured and given in table 5.

TABLE 5

Binder recipes (weight in percent, except total weight in grams)

| Component | Example 17 | Example 18 | Example 19 | Example 20 |
|---|---|---|---|---|
| Maltodextrin (as polyol) | 6.44 | 5.68 | 11.96 | 6.44 |
| Diammonium Phosphate (as crosslinker) | 2.03 | 2.80 | 2.99 | 2.03 |
| 28% Ammonium hydroxide (pH adjuster) | | | | 0.06 |
| gamma-aminopropyl-trihydroxy-silane (2% solution) | 1.27 | 1.27 | 2.24 | 1.27 |
| Water | 90.25 | 90.25 | 82.8 | 90.2 |
| Total (g) | 800 | 800 | 800 | 800 |
| pH observed | 2.4 | 2.363 | 8.42 | 10 |

Example 21: Preparation of Fibrous Product (Handsheet)

Handsheets were made according to the following procedure. To approximately 5 liters of water in a bucket are added 8 drops of NALCO dispersant 01NM159. This dispersion is stirred at a slow speed so as not to produce foam. Wet chop glass fibers (8 grams) are added and allowed to stir for 5 minutes. A screen catch is placed in a 12×12×12 inch 40 liter Williams standard pulp testing apparatus (a.k.a. a "deckle box") and the box is closed. The deckle box is then filled with water to the "3" mark and a plate stirrer is placed in the deckle box. After the glass fiber water is stirred for about 5 minutes, a 0.5% wt. solution of polyacrylamide, NALCO 7768 (80 grams) is added and stirred at low speed for one minute, after which the stirring speed is increased to the highest setting and allowed to stir for an additional 2 minutes. The glass fiber solution is then immediately dumped into the deckle box and stirred with the plate stirrer for 10 rapid strokes. At this point, the valve on the deckle box is depressed until the deckle box was empty. After the deckle box is drained, the box is opened and the screen with the handsheet is removed from the base by holding opposite corners of the screen.

The screen was then placed on a wooden frame and the binder compositions are applied to the handsheet using a roll coater. Excess binder is vacuumed off. The binder-coated handsheet is placed into an oven for drying and curing, typically for three minutes at 400° F. The handsheet is then cut into one inch strips, which are placed in a desiccator overnight.

Example 22: Properties of Fibrous Product (Handsheets)

Handsheets were made according to the general procedure of example 21 except as noted in Table 6 below. The tensile strength, the Loss on Ignition (LOI), and the tensile strength divided by the LOI (tensile strength/LOI) for each sample was determined under ambient (RT) and steam conditions. The tensile strength was measured using Instron. The loss on ignition (LOI) of the reinforcing fibers is the reduction in weight experienced by the fibers after heating them to a temperature sufficient to burn or pyrolyze the organic size from the fibers. The loss on ignition was measured according to the procedure set forth in TAPPI T-1013 OM06, Loss on Ignition of Fiberglass Mats (2006). To place the handsheet in a steam environment, the handsheets were placed in an autoclave at 240° F. at a pressure between 400 and 500 psi for 30 minutes.

The results of this experiment are set forth in Table 6.

TABLE 6

Properties of Fibrous Products

|  | Ex 15 | Ex 16 | Ex 17 | Ex 18 | Ex 19 | Ex 20 |
|---|---|---|---|---|---|---|
| Cure Cycle exceptions |  |  |  |  | 450F for 3 min | 450F for 3 min |
| Tensile Strength (RT) (lbf) | 10.1 | 8.38 | 5.01 | 4.6 | 7.95 | 2.2 |
| LOI (%) | 6.43 | 4.99 | 4.24 | 3.36 | 3.75 | 2.26 |
| Tensile/LOI | 1.57 | 1.68 | 1.18 | 1.37 | 2.12 | 0.97 |
| After Steam aging Tensile Strength (lbf) | 5.76 | 3.27 | 4.33 | 3.88 | — | — |
| After Steam aging LOI (%) | 7.03 | 5.66 | 4.38 | 3.67 | — | — |
| After Steam aging Tensile/ LOI | 0.82 | 0.58 | 0.99 | 1.06 | — | — |

In the following examples 23-25, the formula are given in weight percent except total weight is given in grams.

Example 23: Phosphonic Acid Binder Composition

A binder composition is prepared according to the general procedure of Examples 15-16, using the following recipe:

| Component | Wt % |
|---|---|
| Maltodextrin | 6.50 |
| H3PO3 (crosslinker) | 1.63 |
| 50% H3PO2 (catalyst) | 0.63 |
| 2% Silane Solution | 1.25 |
| Distilled Water | 90.00 |
| Total (g) | 800 |

Example 24: Vinylphosphoric Acid Binder Composition

A binder composition is prepared according to the general procedure of Examples 15-16, using the following recipe:

| Component | Wt % |
|---|---|
| Maltodextrin | 6.50 |
| Vinyl Phosphoric Acid | 1.63 |
| Azo catalyst | 0.02 |
| 2% Silane Solution | 1.25 |
| Distilled Water | 90.61 |
| Total (g) | 800 |

The vinyl portion of the phosphoric acid provides a mechanism for increasing the crosslinking density by free radical reactions, while the phosphoric acid and maltodextrin polyol are free to provide esterification reactions to the phosphodiester linkages.

Example 24: Phosphoric Acid Binder Composition with Synthetic Polyol

A binder composition is prepared according to the general procedure of Examples 15-16, using the following recipe:

| Component | Wt % |
|---|---|
| 100% Joncryl 804 (BASF) | 6.25 |
| 85% H3PO4 | 1.25 |
| 2% Silane Solution | 1.25 |
| Distilled Water | 91.25 |
| Total (g) | 800 |

The BASF JONCRYL® product is a polymeric, synthetic polyol (hydroxyl functionalized polyacrylic acid).

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

The invention claimed is:

1. A method of making a fibrous product comprising:
    applying a binder composition to a pack of randomly oriented fibers, said binder composition comprising:
        at least one water soluble polysaccharide having a dextrose equivalent number of 9 to 14; and
        at least one polyvalent phosphorus crosslinking agent of formula I

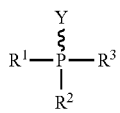

wherein ~Y represents either a double bonded oxygen or a lone pair of electrons; $R^1$ and $R^2$ are independently selected from OH, $OR^4$, $O(CO)R^4$, or $O^-M^+$; and $R^3$ is selected from H, OH, $R^4$, $OR^4$, $O(CO)R^4$, $O^-M^+$ or $OR^5$;
   wherein $R^4$ is $(C_1-C_5)$alkyl, $(C_2-C_5)$alkenyl, $(C_2-C_5)$alkynyl, or aryl; $M^+$ is a cation representing an ionizable salt; and $R^5$ represents a polymeric backbone of 1-20 carbons connected to additional phosphonate moieties; and
    heating the pack to which the binder composition is applied to at least partially cure the binder composition, wherein the cured binder composition comprises hydroxyl groups of the at least one water soluble polysaccharide crosslinked by phosphodiester linkages.

2. The method of claim 1, wherein the binder composition comprises from about 20% to about 99% by weight of the total solids in the binder composition of the at least one polyol; and from about 1% to about 40% by weight of the total solids in the binder composition of the at least one polyvalent phosphorus crosslinking agent.

3. The method of claim 1, wherein the binder composition is free of a catalyst.

4. The method of claim 1, wherein the at least one water soluble polysaccharide is selected from the group consisting of pectin, dextrin, maltodextrin, starch, modified starch, starch derivatives, and combinations thereof.

5. The method of claim 1, wherein the water soluble polysaccharide comprises maltodextrin.

6. The method of claim 5, wherein the maltodextrin has a number average molecular weight of 1,000 to 8,000.

7. The method of claim 1, wherein the binder composition further comprises a silane coupling agent.

8. The method of claim 1, wherein the binder composition further comprises a crosslinking density enhancer comprising maleic anhydride, maleic acid, itaconic acid, or combinations thereof.

9. The method of claim 1, wherein the binder composition further comprises a pH adjuster to adjust a pH of the binder composition to a pH of 1 to 6.

10. The method of claim 1, wherein the binder composition further comprises a pH adjuster to adjust a pH of the binder composition to a pH of 2 to 9.

* * * * *